United States Patent
Chen et al.

(10) Patent No.: US 9,560,709 B2
(45) Date of Patent: Jan. 31, 2017

(54) LED DRIVER AND LED LIGHTING DEVICE

(71) Applicant: Silergy Semiconductor Technology (Hangzhou) LTD, Hangzhou, ZheJiang Province (CN)

(72) Inventors: Huiqiang Chen, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/970,774

(22) Filed: Dec. 16, 2015

(65) Prior Publication Data

US 2016/0212814 A1 Jul. 21, 2016

(30) Foreign Application Priority Data

Jan. 16, 2015 (CN) .......................... 2015 1 0022820

(51) Int. Cl.
*H05B 33/08* (2006.01)

(52) U.S. Cl.
CPC ........ *H05B 33/0845* (2013.01); *H05B 33/089* (2013.01); *H05B 33/0812* (2013.01)

(58) Field of Classification Search
CPC ............ H05B 33/0845; H05B 33/0812; H05B 33/089
USPC ......................................... 315/200 R, 209 R
See application file for complete search history.

(56) References Cited

U.S. PATENT DOCUMENTS

| | | | |
|---|---|---|---|
| 8,773,041 B2 | 7/2014 | Chen | |
| 9,018,849 B2 | 4/2015 | Han et al. | |
| 9,024,542 B2 | 5/2015 | Chen | |
| 9,107,270 B2 | 8/2015 | Chen | |
| 2005/0162101 A1* | 7/2005 | Leong ...................... | F21K 9/00 315/291 |
| 2007/0228994 A1 | 10/2007 | Hung et al. | |
| 2013/0002159 A1 | 1/2013 | Chen et al. | |
| 2013/0181626 A1* | 7/2013 | Chen .................. | H05B 33/0842 315/200 R |
| 2013/0313989 A1* | 11/2013 | Chen .................. | H05B 33/0887 315/200 R |

FOREIGN PATENT DOCUMENTS

| | | |
|---|---|---|
| CN | 103491682 B | 6/2015 |
| WO | 2016029675 A1 | 3/2016 |

* cited by examiner

*Primary Examiner* — Douglas W Owens
*Assistant Examiner* — Jonathan Cooper
(74) *Attorney, Agent, or Firm* — Michael C. Stephens, Jr.

(57) ABSTRACT

An LED driver can include: a rectifying bridge configured to receive an AC current from an electrical ballast, and to generate a DC current; a rectifying and filtering circuit coupled to the rectifying bridge, and configured to rectify and filter the DC current, and to drive an LED load; a power switch coupled between an input of the rectifying and filtering circuit and ground, and configured to be controlled by a switching control signal; a first detecting circuit configured to sample a current that flows through the LED load, and to generate a first detection signal; a second detecting circuit configured to sample an output current of the rectifying bridge, and to generate a second detection signal; and a control circuit configured to generate the switching control signal according to the first and second detection signals.

10 Claims, 5 Drawing Sheets

US 9,560,709 B2

LED DRIVER AND LED LIGHTING DEVICE

RELATED APPLICATIONS

This application claims the benefit of Chinese Patent Application No. 201510022820.5, filed on Jan. 16, 2015, which is incorporated herein by reference in its entirety.

FIELD OF THE INVENTION

The present disclosure generally relates to the field of power electronics, and more particularly to LED drivers and lighting devices.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, an LED driver can include: (i) a rectifying bridge configured to receive an AC current from an electrical ballast, and to generate a DC current; (ii) a rectifying and filtering circuit coupled to the rectifying bridge, and configured to rectify and filter the DC current, and to drive an LED load; (iii) a power switch coupled between an input of the rectifying and filtering circuit and ground, and configured to be controlled by a switching control signal; (iv) a first detecting circuit configured to sample a current that flows through the LED load, and to generate a first detection signal; (v) a second detecting circuit configured to sample an output current of the rectifying bridge, and to generate a second detection signal; and (vi) a control circuit configured to generate the switching control signal according to the first and second detection signals.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

An electrical ballast is one type of ballast that can convert a DC voltage or a low frequency AC voltage to a high frequency voltage. This conversion can be utilized in driving electronic control units, such as a low voltage gas discharge lamp (e.g., a germicidal lamp), a halogen tungsten lamp, and so on. However, an electrical ballast may only give out energy by auto-oscillation, and may not generate a constant voltage or a constant current. As a result, an electrical ballast may not be suitable for driving a light-emitting diode (LED) load that typically requires a DC current.

Figure 1:
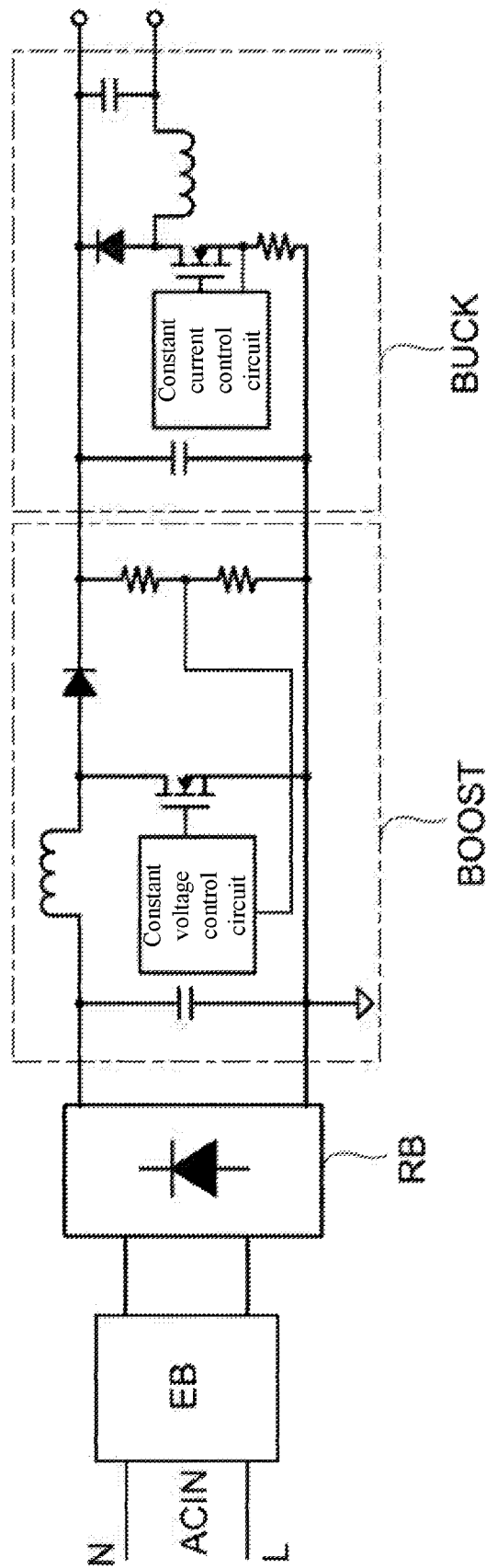
FIG. 1 is a schematic block diagram of an example LED driver with an electrical ballast.

Referring now to FIG. 1, shown is a schematic block diagram of an example LED driver with an electrical ballast. Here, a rectifying bridge, a boost-type converter, and a buck-type converter may generally be cascade-connected to an output port of the electrical ballast, in order to form an LED driver. Rectifying bridge RB can generate a DC signal by rectifying an AC signal. Boost-type converter BOOST can maintain an input voltage for the latter stage as substantially constant by a constant voltage control method, such as when the output voltage of electrical ballast EB may vary in a relatively large range. Buck-type converter BUCK can convert the output voltage of boost-type converter BOOST to a substantially constant current by a constant current control method, in order to drive an LED load. However, such an LED driver with an electrical ballast may have a relatively high product cost and large volume because it is a two-stage converter. Further, it may be difficult to achieve control and/or cooperation between the two converters.

In one embodiment, a light-emitting diode (LED) driver can include: (i) a rectifying bridge configured to receive an AC current from an electrical ballast, and to generate a DC current; (ii) a rectifying and filtering circuit coupled to the rectifying bridge, and configured to rectify and filter the DC current, and to drive an LED load; (iii) a power switch coupled between an input of the rectifying and filtering circuit and ground, and configured to be controlled by a switching control signal; (iv) a first detecting circuit configured to sample a current that flows through the LED load, and to generate a first detection signal; (v) a second detecting circuit configured to sample an output current of the rectifying bridge, and to generate a second detection signal; and (vi) a control circuit configured to generate the switching control signal according to the first and second detection signals.

Figure 2:
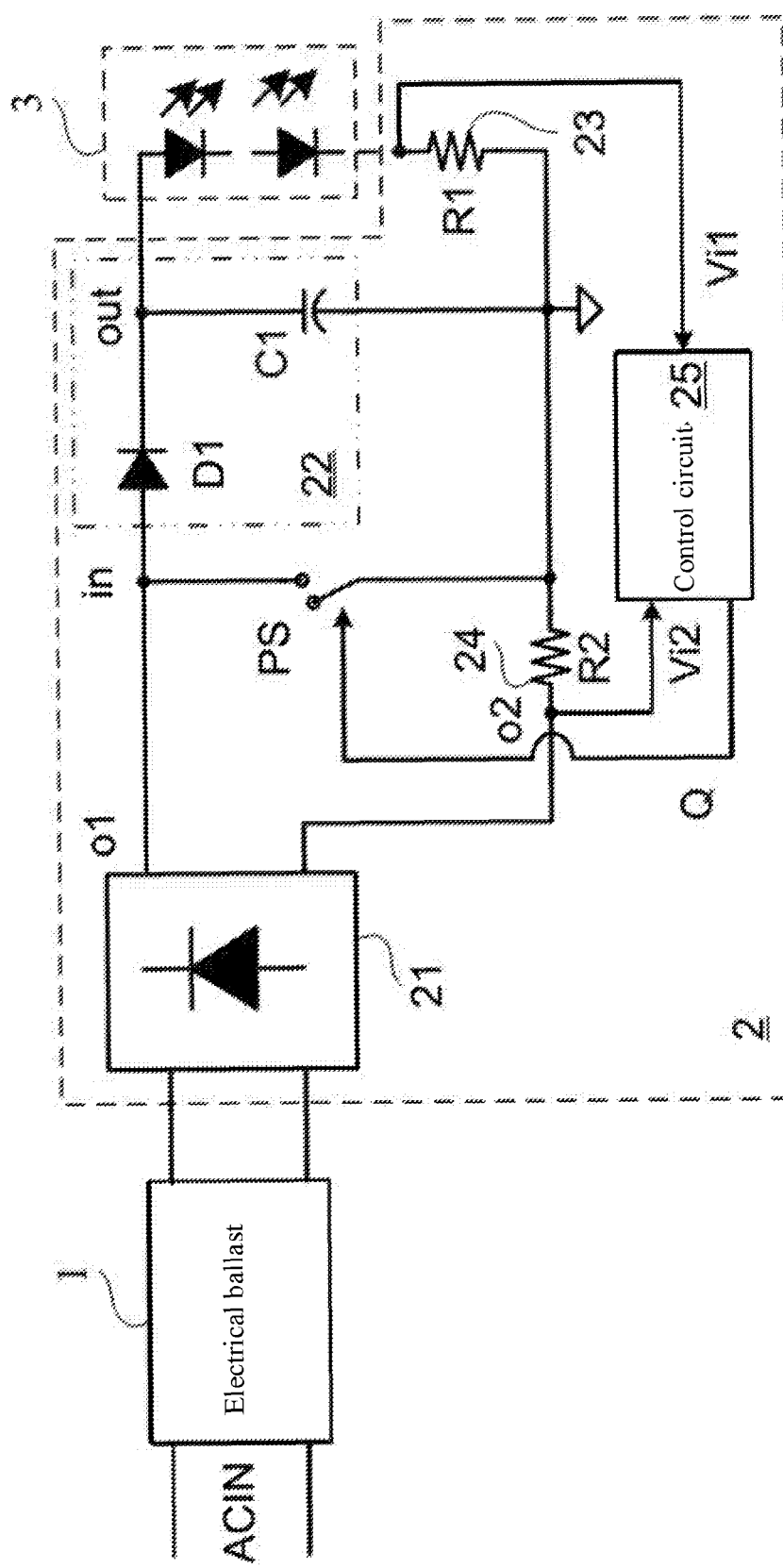
FIG. 2 is a schematic block diagram of a first example LED lighting device, in accordance with embodiments of the present invention.

Referring now to FIG. 2, shown is a schematic block diagram of a first example LED lighting device, in accordance with embodiments of the present invention. In this particular example, the LED lighting device can include electrical ballast 1, LED driver 2, and LED load 3. Electrical ballast 1 can receive a low frequency AC current, and may generate a high-frequency AC current. An output terminal of an electrical ballast can be equivalent to an AC current source due to providing energy by auto-oscillation. LED driver 2 can receive the AC current generated by electrical ballast 1, and may generate a substantially constant current in order to drive LED load 3.

LED driver 2 can include rectifying bridge 21, rectifying and filtering circuit 22, power switch PS, detecting circuits 23 and 24, and controlling circuit 25. Rectifying bridge 21 can receive the AC current generated by electrical ballast EB, and may generate a DC current by rectifying the AC current. For example, rectifying bridge 21 can be a full-bridge rectifying bridge, or a half-bridge rectifying bridge. Since the output of electrical ballast 1 can be equivalent to an AC current source, the output of rectifying bridge 21 can accordingly be equivalent to a DC current source. Therefore, it may be possible to control the average value of a current flowing through the LED load by chopping the DC current source.

Rectifying and filtering circuit 22 can connect to an output of rectifying bridge 21, for rectifying and filtering the DC current, and to further drive the LED load. For example, rectifying and filtering circuit 22 can include diode D1 connected between input terminal "in" and output terminal "out" of rectifying and filtering circuit 22, and capacitor C1 connected between output terminal "out" of rectifying and filtering circuit 22 and ground. Diode D1 can be used to prevent the reverse flow of a current, and capacitor C1 may be used to filter a signal to be provided to LED load 3. Those skilled in the art will recognize that rectifying and filtering circuit 22 can also be implemented via other suitable circuit structures.

Power switch PS can connect between ground and input terminal "in" of rectifying and filtering circuit 22, and may be controlled by switching control signal Q. Input terminal "in" of rectifying and filtering circuit 22 can effectively be shorted to ground when power switch PS is turned on, so the DC current generated by rectifying bridge 21 may fully flow through power switch PS, instead of flowing to LED load 3. The rectified current generated by rectifying bridge 21 may be provided to LED load 3 via rectifying and filtering circuit 22 when power switch PS is turned off. In this way, the average value of the current flowing through LED load 3 can be controlled by chopping the output current of electrical ballast 1 by continuously turning power switch PS on and off, so as to maintain the output current of LED driver 2 as substantially constant.

Detecting circuit 23 can sample the current flowing through LED load 3, and may generate detection signal Vi1. In this particular example, detecting circuit 23 can include resistor R1 connected in series between LED load 3 and ground. Thus, a voltage at a common node of resistor R1 and LED load 3 can be configured as detection signal Vi1 that represents the current flowing through LED load 3. Of course, resistor R1 can alternatively be connected between an output terminal of the LED driver and the LED load. In such case, a voltage across resistor R1 can be taken as detection signal Vi1 that represents the current flowing through LED load 3.

Detecting circuit 24 can sample the output current of rectifying bridge 21, and may generate detection signal Vi2. In this particular example, detecting circuit 24 can include resistor R2 connected between ground and terminal o2 of the output of rectifying bridge 21. Because the current flowing out of terminal o1 of the output of rectifying bridge 21 may flow into terminal o2 on the basis of circuit theory, a voltage at terminal o2 can be utilized to represent the output current of the rectifying bridge.

Figure 3:
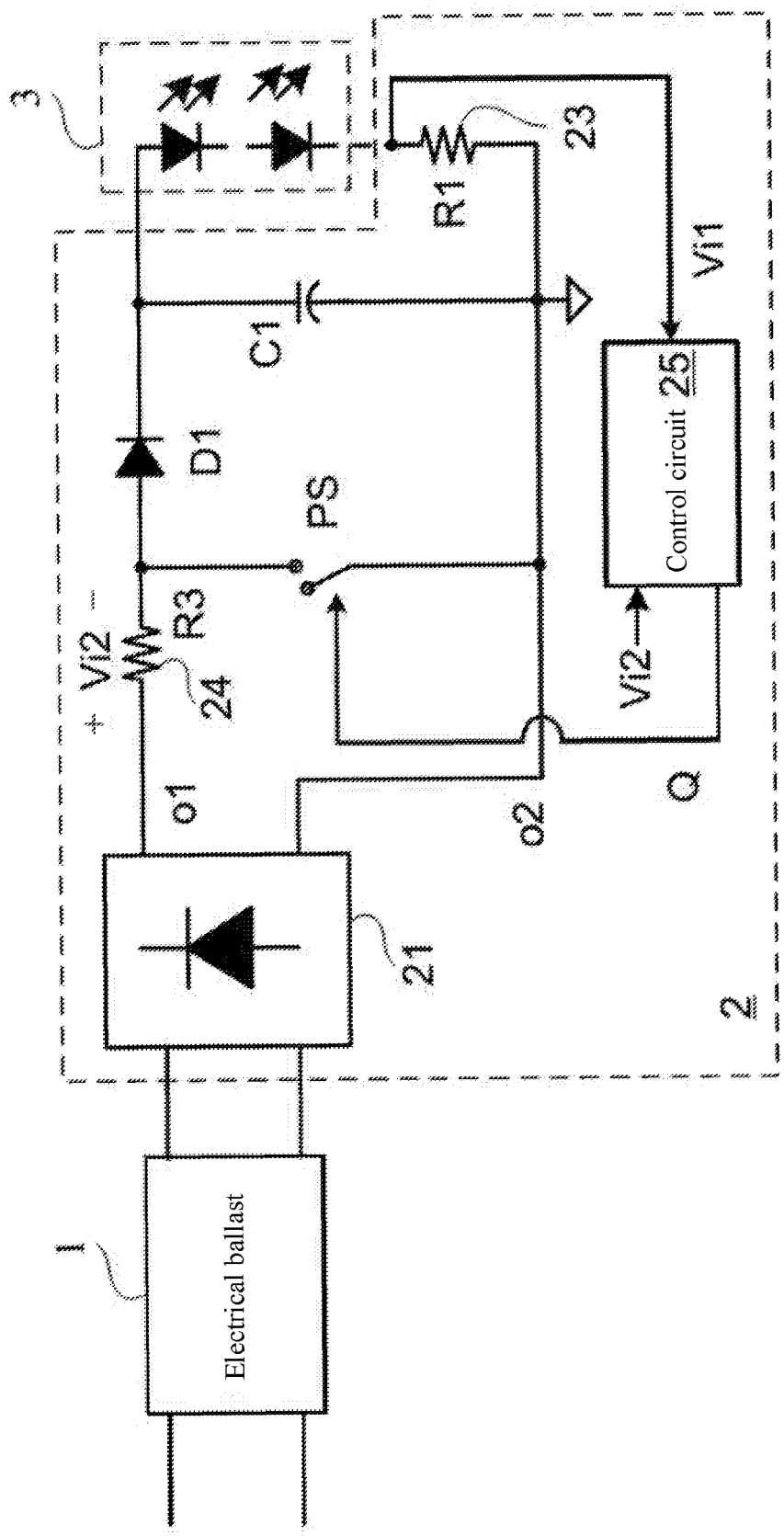
FIG. 3 is a schematic block diagram of a second example LED lighting device, in accordance with embodiments of the present invention.

Referring now to FIG. 3, shown is a schematic block diagram of a second example LED lighting device, in accordance with embodiments of the present invention. In this particular example, detecting circuit 24 can include resistor R3 connected to terminal o1 of the output of rectifying bridge 21. In such case, a voltage across resistor R3 can be configured as detection signal Vi2 that represents the output current of rectifying bridge 21. In addition, control circuit 25 can generate switching control signal Q according to detection signals Vi1 and Vi2. Switching control signal Q may be used to control (e.g., turn on/off) power switch PS, and to effectively periodically short the input of the rectifying and filtering circuit to ground, in order to realize a constant voltage control.

Figure 4:
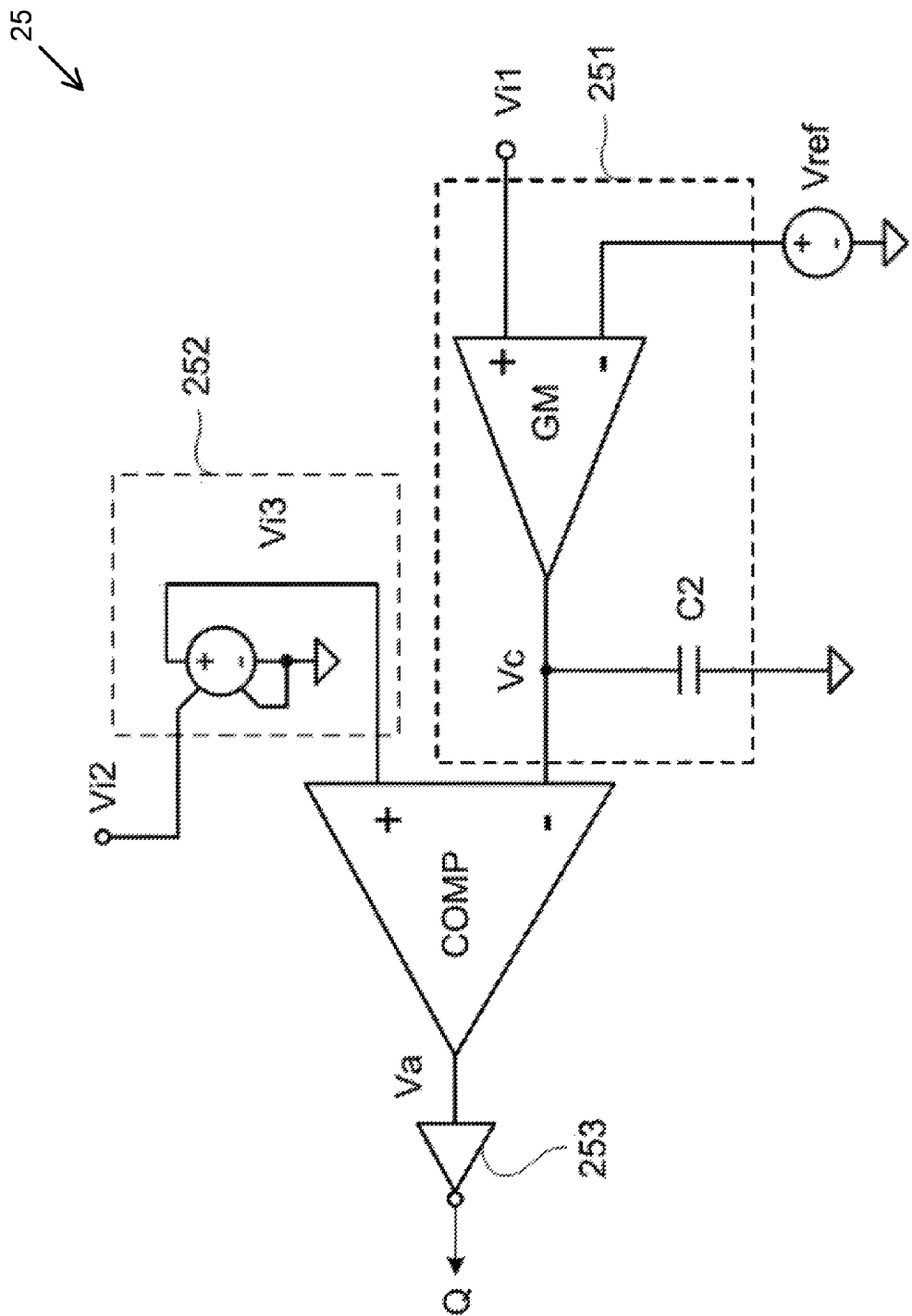
FIG. 4 is a diagram of an example control circuit, in accordance with embodiments of the present invention.

Referring now to FIG. 4, shown is a diagram of an example control circuit, in accordance with embodiments of the present invention. In this particular example, control circuit 25 can include current compensating circuit 251, signal conversion circuit 252, comparator COMP, and logic circuit 253. Current compensating circuit 251 can receive detection signal Vi1 and reference voltage Vref that represents a desired current, and may generate compensation signal Vc. Compensation signal Vc may represent a difference between detection signal Vi1 and reference voltage Vref. In this example, current compensating circuit 251 can include transconductance amplifier GM, and capacitor C2 connected between an output of transconductance amplifier GM and ground. Transconductance amplifier GM may have a non-inverting input that receives detection signal Vi1 and an inverting input that receives reference voltage Vref. Transconductance amplifier GM can charge or discharge capacitor C2 according to a difference between detection signal Vi1 and reference voltage Vref, so that voltage Vc across capacitor C2 may represent the difference between detection signal Vi1 and reference voltage Vref. Those skilled in the art will recognize that compensating circuit 251 can alternatively be implemented by other suitable circuits or components, such as a differential amplifier.

Signal conversion circuit 252 may generate detection signal Vi3 to synchronize the output current of the rectifying bridge according to detection signal Vi2. Detection signal can be generated by appropriately converting detection signal Vi2, and may not only represent the variation of the output current of rectifying bridge 21, but also be suitable for the control circuit. When detecting circuit 24 includes resistor R2 connected between ground and terminal o2 at the output of rectifying bridge 21 (see, e.g., FIG. 2), the voltage at terminal o2 may be configured as detection signal Vi2. Thus, detection signal Vi2 may be a voltage less than 0, and having an amplitude that represents the output current of rectifying bridge 21.

Detection signal Vi2 can be reversed by setting signal conversion circuit 252 2 be a controlled voltage source with the control coefficient of −1, so as to generate detection signal Vi3 that represents the output current of rectifying bridge 21. It is to be understood that the control coefficient can be other values according to practical requirements and parameters of the remaining circuitry. When detecting circuit 24 includes resistor R3 connected to terminal o1 at the output of rectifying bridge 21 (see, e.g., FIG. 3), because one terminal of resistor R3 may not be continuously coupled to ground, the voltage across resistor R3 can be configured as detection signal Vi3.

Comparator COMP can compare compensation signal Vc against detection signal Vi3, and may generate comparison result Va. In this particular example, comparator COMP may have a non-inverting input that receives detection signal Vi3, and an inverting input that receives compensation signal Vc. Logic circuit 253 can generate switching control signal Q according to comparison result Va. Logic circuit 253 may logically transform the waveform shape of the comparison result, and in this case can include an inverter.

Those skilled in the art will recognize that logic circuit 253 can utilize other logic functions in order to transform comparison result Va according to different settings or efficient electric levels of circuit compensating circuit 251 and signal conversion circuit 252. Logic circuit 253 may also include an active component for shaping the waveform of comparison result Va, such that switching control signal Q meets requirements of power switch PS. In this way, a control circuit formed by a compensating circuit and a comparator, in order to cooperate with a signal conversion circuit and a logic circuit, may have a relatively simple circuit structure with a relatively high control accuracy.

Figure 5:
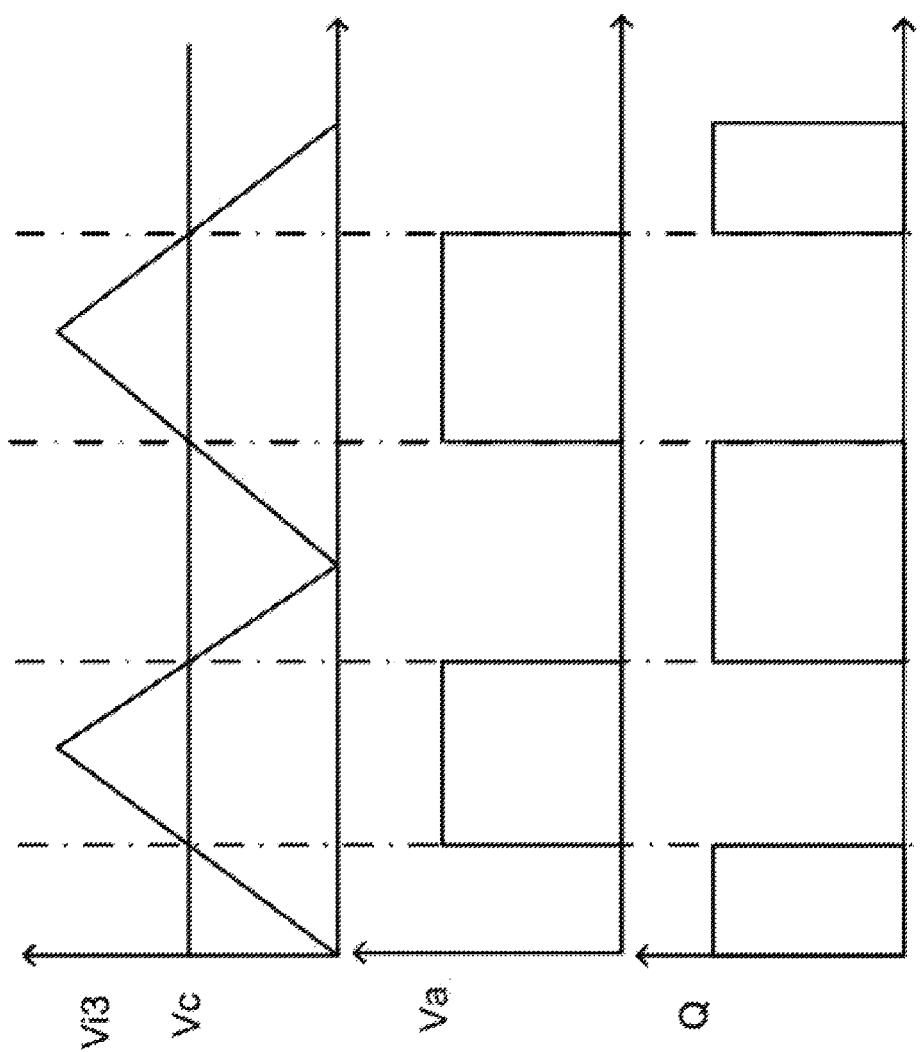
FIG. 5 is a waveform diagram of example operation of a control circuit, in accordance with embodiments of the present invention.

Referring now to FIG. 5, shown is a waveform diagram of example operation of a control circuit, in accordance with embodiments of the present invention. In this example, compensating signal Vc may be a relatively stable value, while detection signal Vi3 can vary along with the output current of rectifying bridge 21. When detection signal Vi3 is less than compensation signal Vc, comparison result Va can be inactive (e.g., a low level), and switching control signal Q may be active (e.g., a high level). That is, when detection signal Vi3 is less than compensation signal Vc, control circuit 25 can turn on power switch PS, so as to effectively short input of the rectifying and filtering circuit 21 to ground. When detection signal Vi3 is greater than compensation signal Vc, comparison result Va can be activated, and switching control signal Q may be deactivated. That is, when detection signal Vi3 is greater than compensation signal Vc, control circuit 25 can turn off power switch PS.

When detection signal Vi1 is greater than reference voltage Vref, such as when the current flowing through the LED load is relatively high, compensation signal Vc can increase, and the duty cycle of comparison result Va may decrease. Thus, the duty cycle of switching control signal Q obtained by inverting comparison result Va via an inverter may increase, and the on time of power switch PS can accordingly increase. As a result, this may reduce the average current that flows through the LED load.

When detection signal Vi1 is less than reference voltage Vref, such as when the current flowing through the LED load is relatively small, compensation signal Vc can decrease, and the duty cycle of comparison result Va may increase. Thus, the duty cycle of switching control signal Q obtained by inverting comparison result Va via an inverter can decrease, and the on time of power switch PS may accordingly decrease, in order to increase the average current that flows through the LED load.

In this way, the output current of LED driver 2 (e.g., current that flows through the LED load) may be close to the desired current relative to reference voltage Vref. Similarly, when variation occurs on the output current of rectifying bridge 21, the duty cycle of switching control signal Q may accordingly increase or decrease such that the output current of LED driver 2 (e.g., current that flows through the LED load) may be close to the desired current relative to reference voltage Vref.

In this way, a rectifying bridge (e.g., 21) and a rectifying and filtering circuit (e.g., 22) may be cascade coupled to the output of an electrical ballast (e.g., 1) to provide a DC current for driving the LED load (e.g., 3). Since the electrical ballast can be equivalent to a current source, the average current that flows through the LED load can be controlled by periodically shorting the input of the rectifying and filtering circuit via a power switch (e.g., PS), so as to achieve constant control. In this way, an LED load may be driven with a relatively simple circuit structure and control scheme, with low product costs and a small circuit size, based on the output of an electrical ballast, and without an inductive component.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A light-emitting diode (LED) driver, comprising:
    a) a rectifying bridge configured to receive an AC current from an electrical ballast, and to generate a DC current;
    b) a rectifying and filtering circuit coupled to said rectifying bridge, and configured to rectify and filter said DC current, and to drive an LED load;
    c) a power switch coupled between an input of said rectifying and filtering circuit and ground, and configured to be controlled by a switching control signal such that said rectifying and filtering circuit is shorted when said power switch is turned on by said switching control signal;
    d) a first detecting circuit configured to sample a current that flows through said LED load, and to generate a first detection signal;
    e) a second detecting circuit configured to sample an output current of said rectifying bridge, and to generate a second detection signal; and
    f) a control circuit configured to generate said switching control signal according to said first and second detection signals.

2. The LED driver according to claim 1, wherein said control circuit comprises:
    a) a current compensating circuit configured to receive said first detection signal and a reference voltage that represents a desired current, and to generate a compensation signal that represents a difference between said first detection signal and said reference voltage;
    b) a signal conversion circuit configured to generate a third detection signal that synchronizes with said output current of said rectifying bridge according to said second detection signal;
    c) a comparator configured to compare said compensation signal against said third detection signal, and to generate a comparison result; and
    d) a logic circuit configured to generate said switching control signal according to said comparison result.

3. The LED driver according to claim 2, wherein said current compensating circuit comprises:
    a) a transconductance amplifier having a non-inverting input configured to receive said first detection signal, and an inverting input configured to receive said reference voltage; and
    b) a capacitor coupled between an output of said transconductance amplifier and ground.

4. The LED driver according to claim 2, wherein said signal conversion circuit comprises a controlled voltage source.

5. The LED driver according to claim 1, wherein said rectifying and filtering circuit comprises:
   a) a diode coupled between an input and output terminals of said rectifying and filtering circuit; and
   b) a capacitor coupled between said output terminal of said rectifying and filtering circuit and ground.

6. The LED driver according to claim 1, wherein said first detecting circuit comprises a first resistor coupled in series with said LED load.

7. The LED driver according to claim 1, wherein said second detecting circuit comprises a second resistor coupled between said rectifying bridge and said rectifying and filtering circuit.

8. The LED driver according to claim 7, wherein said second resistor is coupled between an output of said rectifying bridge and said input terminal of said rectifying and filtering circuit.

9. The LED driver according to claim 7, wherein said second resistor is coupled between an output of said rectifying bridge and said ground.

10. An LED lighting device, comprising:
   a) an electrical ballast;
   b) the LED driver of claim 1, wherein said LED driver is coupled to said electrical ballast; and
   c) an LED load coupled to said LED driver.

\* \* \* \* \*